Nov. 5, 1968  E. E. HULSEY  3,409,270
VARIABLE ORIFICE PLUG TYPE VALVE
Filed Oct. 4, 1965  2 Sheets-Sheet 1
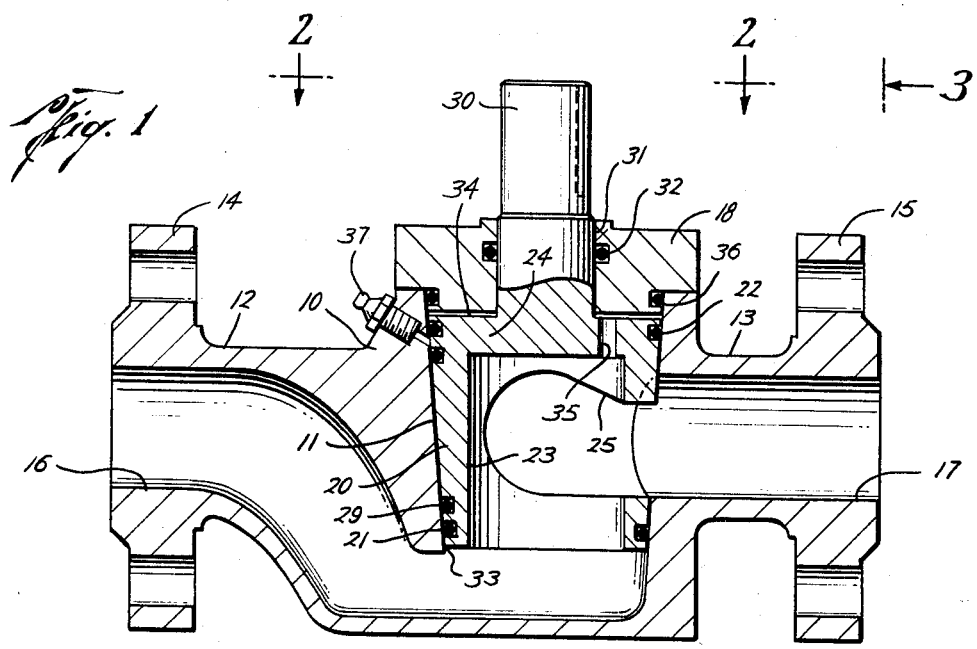
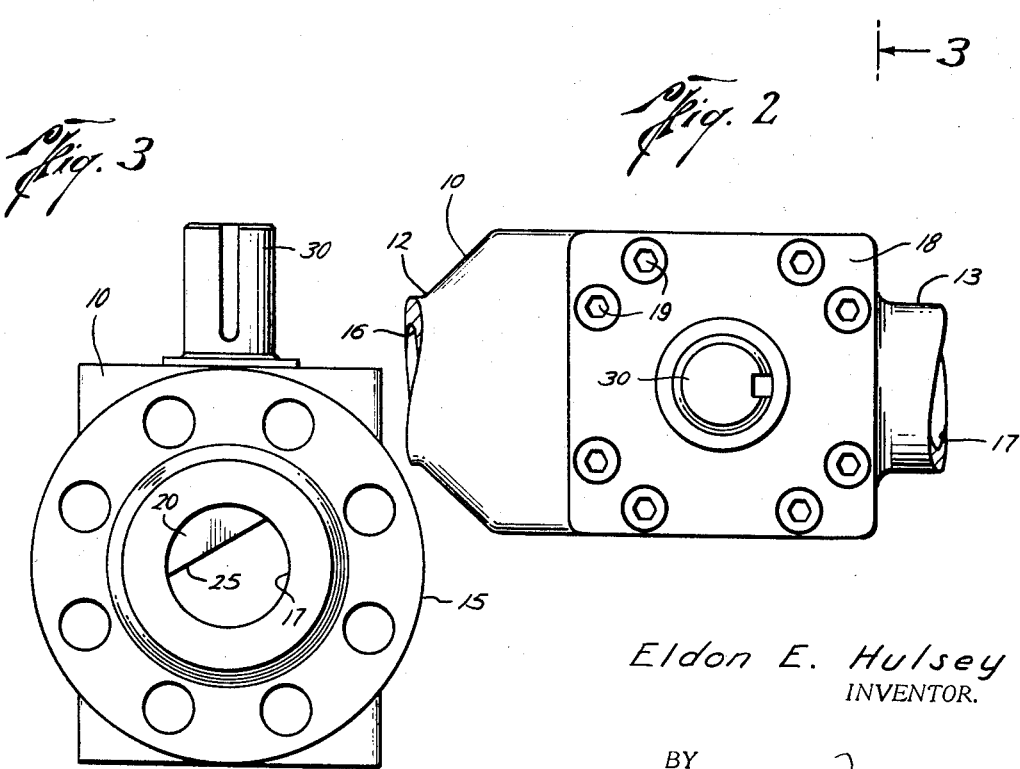
Eldon E. Hulsey
INVENTOR.
BY
ATTORNEY Nov. 5, 1968    E. E. HULSEY    3,409,270
VARIABLE ORIFICE PLUG TYPE VALVE
Filed Oct. 4, 1965    2 Sheets-Sheet 2
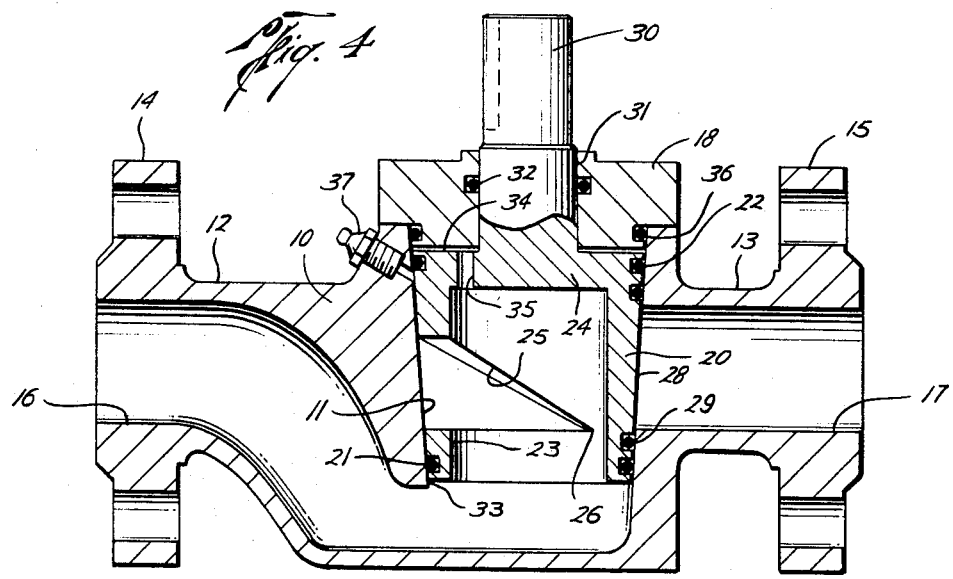
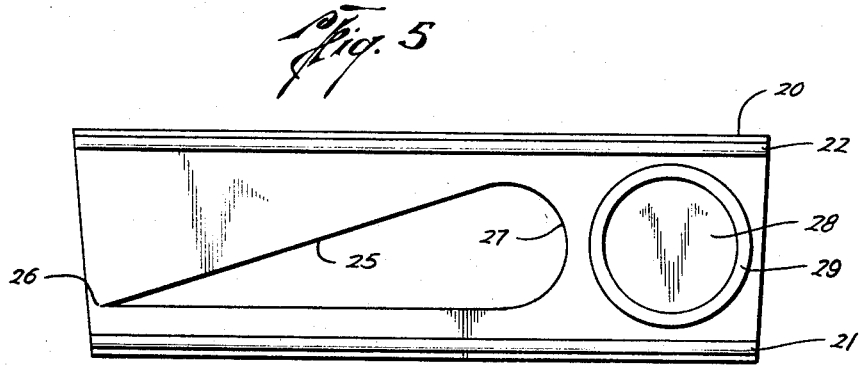
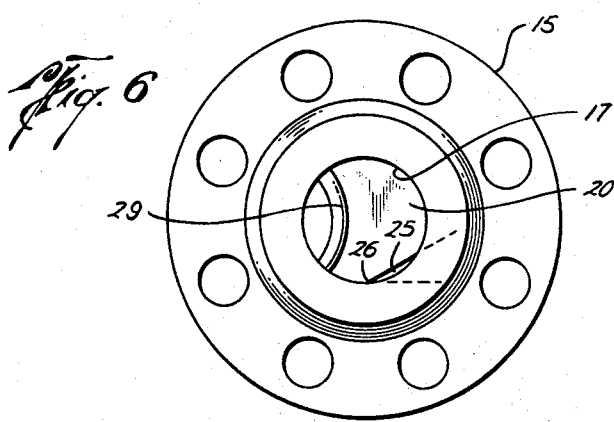
Eldon E. Hulsey
INVENTOR.
BY
ATTORNEY

United States Patent Office 3,409,270
Patented Nov. 5, 1968

3,409,270
VARIABLE ORIFICE PLUG-TYPE VALVE
Eldon E. Hulsey, 5747 Warm Springs,
Houston, Tex. 77035
Filed Oct. 4, 1965, Ser. No. 492,475
1 Claim. (Cl. 251—209)

ABSTRACT OF THE DISCLOSURE

A plug-type valve in which the plug member is open at one end to communicate with one of the valve flow ports and has a side port of elongated, generally tear-drop shape extending circumferentially of the plug member for communication with the other valve flow port and to provide a non-ported closure segment between the ends of the side port for closing off the flow passage through the valve.

---

This invention relates to valves and more particularly to variable orifice plug-type valves for regulating the flow of fluids, particularly gas.

In many industrial installations requiring large volume supplies of gas for fuel purposes or for processing, regulation and control of the rate of flow of such fluids is accomplished by means of various types of valves. In most instances where large volume flows are involved, these valves are ordinarily conventional gate or plug valves having orifices of fixed areas which do not lend themselves readily to close regulation of the rate of flow through the valve.

The present invention has for its principal object the provision of an improved form of valve having a variable area orifice in the closure member adapted to permit a wide range of control of flow therethrough.

An important object is the provision of a plug-type valve having an orifice therethrough varying in area over a wide range.

A more specific object is the provision of a plug-type valve in which the closure member is hollow and provided with an orifice of continuously varying area extending through an angular distance of about 270° about the periphery thereof.

A further object is the provision of a plug-type valve in which the closure member has an orifice of continuous varying area which, in the developed view, has a generally teardrop-like configuration.

Other and more specific objects and advantages of this invention will become more readily apparent from the following detailed description when read in conjunction with the accompanying drawing which illustrates a useful embodiment in accordance with this invention.

In the drawing,

FIG. 1 is a longitudinal, sectional view showing the closure member in partially opened position;

FIG. 2 is a top plan view taken along line 2—2 of FIG. 1;

FIG. 3 is an end view taken along line 3—3 of FIG. 1 looking toward the discharge end of the valve;

FIG. 4 is a view similar to FIG. 1 showing the valve in the fully closed position;

FIG. 5 is a developed view of the closure member to illustrate the shape of the orifice; and FIG. 6 is an end view similar to FIG. 3 showing the closure member at a slightly open or metering position.

Referring to the drawing, the valve comprises a body 10 enclosing a vertically disposed valve chamber 33 which, in the illustrative embodiment, is defined by a downwardly tapering frusto-conical valve seat 11.

The body is provided with oppositely extending inlet and outlet nozzles 12 and 13, respectively, the ends of which carry bolt flanges 14 and 15, respectively, for connecting the valve to a pipe line. It will be understood that other types of conventional connection elements may be substituted for bolt flanges 14 and 15. Inlet nozzle 12 is provided with an inlet passage 16 which communicates with the lower end of valve chamber 33 and outlet nozzle 13 has an outlet passage 17 which communicates with chamber 33 at a point intermediate the ends thereof. A bonnet 18 is bolted to the upper end of body 10 by means of cap screws or bolts 19 to form a closure for the upper end of the valve chamber. A tapered closure member, such as plug 20, is rotatably seated on valve seat 11, the external taper of the plug being complementary to seat 11, as shown. An annular packing 21 is positioned about the lower end of plug 20 to form a circumferential seal between the lower end of the plug and valve seat 11 at a point below passage 17. A similar annular packing 22 is arranged in the outer surface of the plug to form a circumferential seal between the upper end of plug 20 and seat 11 at a point above passage 17.

Plug 20 is hollow, being provided with a bore 23 closed at its upper end by an end wall 24 and opened at its lower end into communication with inlet passage 16. An orifice 25 is cut through the side wall of plug 20 below upper end wall 24 and extends generally circumferentially about the plug for an angular distance of about 270°. As best seen in FIG. 5, orifice 25 has a generally triangular configuration extending between an apex 26 and a base 27 which is preferably of semi-circular shape, thereby giving the orifice a generally teardrop shape. With this shape of orifice, it will be seen that the area thereof will be continuously varying from end to end throughout the angular distance over which it extends. It will be understood that the configuration of orifice 25 may be varied from that illustrated, in that, while the latter shows a continuously, substantially uniform variation, the geometric shape of the orifice may vary considerably while still retaining the advantage of the changing area. The remaining non-perforate portion of plug 20, covering about 90° of its circumference, forms the closure face 28 of the plug and is enclosed by a circular seal packing 29, such as an O-ring, embedded in the outer surface of the plug and adapted, when the plug is in the fully closed position (FIG. 4) to seal between the plug and the seat about outlet passageway 17.

A stem 30 extends through a stuffing box 31 in bonnet 18 and is secured in any suitable manner to the upper end of plug 20. Seal packing 32 is disposed in stuffing box 31 to seal about the stem, which is adapted for connection to any suitable and conventional type of operator, not shown.

Plug 20 is made to a length somewhat less than that of seat 11, providing an annular space 34 between the inner end of bonnet 18 and upper end wall 24 of the plug. A pressure balancing passage 35 extends through end wall 24, communicating bore 23 of the plug with annular space 34. The purpose of passage 35 is to balance the pressure across the plug during operation. By suitably dimensioning the pressure-effective area on top of the plug relative to the pressure-effective area on the lower side of the plug, the seating force operable to hold plug 20 on seat 11 may be varied as desired. An annular packing 36 is provided between bonnet 18 and the upper end of seat 11 to seal off above annular space 34. Lubricant may be supplied between the engaging surfaces of plug 20 and seat 11 by means of a pressure-type fitting 37 which extends through the wall of body 10 and communicates with seat 11 at a point below upper seal 22.

In operation, it will be seen that as the angular position of the plug is changed, the area of orifice 25 exposed to outlet passage 17 will vary continuously, increasing in one direction and decreasing in another, and that the plug may be rotated throug an angle of about 270° from the fully opened to the fully closed position. This gives a very wide range of variation in the orifice area and, therefore, in the flow rate through the valve. FIGS. 1 and 3 show the position of the plug and the orifice when the plug is about half-way open. FIG. 6 shows the position of the plug with respect to discharge passage 17 when the plug is very slightly open in the so-called "metering" position.

By means of the construction heretofore described, it will be evident that an extremely wide range of variation in the rate of flow through the valve may be obtained as compared with more conventional designs of plug valves in which the extent of rotation is limited to 90° between the fully opened and fully closed position, and without the continuously changing orifice area available with the present design. This affords a maximum degree of control of the flow rate through the valve, which is highly desirable in numerous installations where high volumes of fluids, such as gas particularly, are employed and must be varied over narrow increments between rather wide limits.

While the illustrative embodiment shows a plug valve of the type employing a tapered plug, it will be understood that the same principles may be employed with a valve having a cylindrical plug, as well as in ball valves now commonly used for high volume fluid flows.

It will be understood that instead of a circumferential length of up to about 270° of the preferred embodiment, orifice 25 may be made shorter. In general, an angular length ranging from about 120° to about 270° may be employed, depending upon the service and the degree of area variation desired.

Although, for purposes of this description, passage 16 is referred to as the inlet passage and passage 17 as the outlet passage, it will be evident that their functions may be reversed.

It will be understood that various other alterations and modifications may be made in the details of the illustrative embodiment within the scope of the appended claim but without departing from the spirit of the invention.

What I claim and desire to secure by Letters Patent is:

1. A plug-type valve, comprising a casing having inlet and outlet passages, a valve chamber in said casing having a circumferential wall defining a valve seat, said chamber communicating at one end with one of said passages and communicating at an intermediate point along said wall with the other of said passages, a plug-type closure member rotatably disposed on said seat, said closure member comprising a hollow body open at one end into communication with said one of said passages, an end wall closing the opposite end of the plug body, a circumferentially elongate port through the side wall of the plug body having an angular length of about 270° and disposed to register with said other of said passages, said port being of generally tear shaped configuration with one edge of said port being parallel to a plane containing the open end of the closure member whereby to form an orifice of continuously varying area as the plug member is rotated past said other passage, the non-ported portion of said plug body defining a single closure segment having an angular length of about 90° operable to close off said other passage when in registration therewith, an annular seal element arranged to seal between said single closure segment and said seat about said other passage, spaced apart upper and lower annular seal means about the plug body arranged to seal between said closure member and said seat at points above and below said other passage, and a pressure-equalizing passage through said end wall communicating the interior of the plug body with said valve chamber above said upper seal means.

References Cited

UNITED STATES PATENTS

| | | | |
|---|---|---|---|
| Re. 25,029 | 8/1961 | Mueller | 251—283 X |
| 871,956 | 11/1907 | Rice | 251—283 X |
| 1,674,743 | 6/1928 | Rudolph | 251—209 X |
| 2,510,514 | 6/1950 | Mueller | 251—209 |
| 2,902,253 | 9/1959 | Page | 251—209 |
| 3,173,448 | 3/1965 | Jones | 251—209 |
| 3,193,245 | 7/1965 | Parker | 251—209 X |

FOREIGN PATENTS

| | | |
|---|---|---|
| 24,688 | 7/1907 | Switzerland. |
| 94,705 | 11/1962 | Denmark. |

M. CARY NELSON, *Primary Examiner.*

ROBERT C. MILLER, *Assistant Examiner.*